(12) United States Patent
Wutka

(10) Patent No.: US 7,711,324 B2
(45) Date of Patent: May 4, 2010

(54) METHOD AND SYSTEM FOR CONNECTING REMOTE DEVICES FOR COMMUNICATION WITH EACH OTHER

(75) Inventor: Anthony D. Wutka, McKinney, TX (US)

(73) Assignee: Cambridge Silicon Radio Limited, Cambridge (GB)

( * ) Notice: Subject to any disclaimer, the term of this patent is extended or adjusted under 35 U.S.C. 154(b) by 719 days.

(21) Appl. No.: 11/424,866

(22) Filed: Jun. 17, 2006

(65) Prior Publication Data
US 2007/0294556 A1     Dec. 20, 2007

(51) Int. Cl.
*H04B 7/00* (2006.01)
(52) U.S. Cl. .................. 455/41.2; 455/556.1; 455/557; 713/1; 713/2; 713/100; 710/8; 710/10; 710/11; 710/12
(58) Field of Classification Search ................. 455/41.2, 455/556.1–556.2, 557, 558, 572; 713/1, 713/2, 100; 710/8–14
See application file for complete search history.

(56) References Cited

U.S. PATENT DOCUMENTS 7,165,171 B2 *    1/2007   Zhang et al. .................... 713/1
2006/0139220 A1 *  6/2006   Hirota et al. ................. 343/702

* cited by examiner

*Primary Examiner*—Tuan A Tran
(74) *Attorney, Agent, or Firm*—Novak Druce DeLuca + Quigg LLP

(57) ABSTRACT

A data processing system operable in a powered-up mode to accept user input from a first set of user input devices and in a powered-down mode to accept user input from only a second set of user input devices, the data processing system being configured when not in the powered-down mode to detect a user input from one of the second set of user input devices, and in response to such detection to initiate a connection procedure to enable communication in the powered-up mode between the data processing system and a remote user input devices.

23 Claims, 2 Drawing Sheets

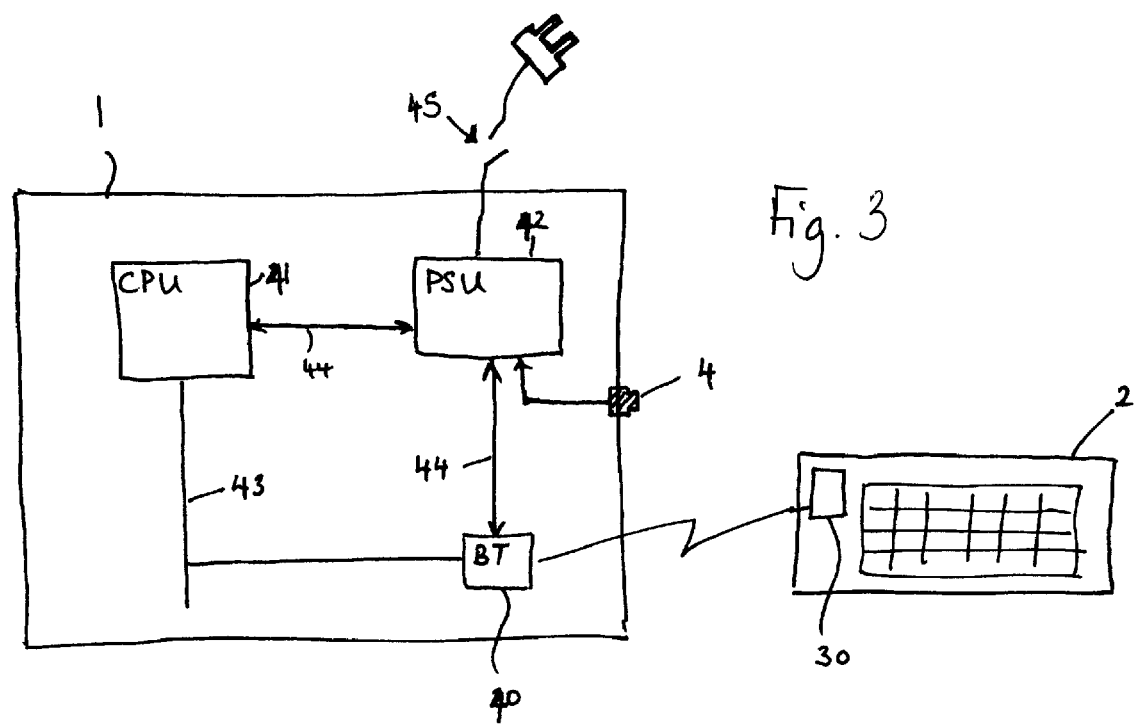

METHOD AND SYSTEM FOR CONNECTING REMOTE DEVICES FOR COMMUNICATION WITH EACH OTHER

BACKGROUND OF THE INVENTION

1. Field of the Invention

The present invention relates to initiating connection procedures to enable communication between devices, and in particular but not exclusively the invention relates to connecting devices so as to enable secure wireless communication between them.

2. Discussion of Background Art

Devices in a Bluetooth communication system can communicate with each other by radio in accordance with the Bluetooth radio protocols. Each Bluetooth-enabled device has an individual device identity (a Bluetooth device address), which allows devices to identify one another. Using Bluetooth, devices can communicate in ad hoc networks, for example to enable convenient data transfer during a conference. Devices can also be paired, by the exchange of security information between the devices so as to allow the devices to authenticate themselves to each other. Whether or not the devices are paired in a secure way, it can be advantageous for two devices to be configured to communicate specifically with each other. For example, a specific mobile phone may be configured to operate with a specific radio headset with the effect that when the phone is in operation it communicates with that particular headset to provide audio to a user via the headset. Similarly, a specific keyboard or mouse may be configured to operate with a specific personal computer (PC) to enable a user to provide commands or data to the PC wirelessly through the keyboard. This can be achieved by means of the unique identities of each device in the system, with the devices that are to communicate together storing each others' identities and using them to communicate with the other devices when required.

Devices may interoperate for providing various functions to each other. For example, a notebook computer may be configured to interoperate with a specific mobile phone for communication functions and with a mouse for user input functions. This is achieved by a device storing the identities of the devices with which it is to interoperate in association with the functions for which they are paired. Then, when the device requires a particular function it can attempt to contact the appropriate counterpart device.

One objective of configuring devices in this way is to ensure that when there are several devices nearby, a device chooses to communicate with the right one. For example, in a crowded space several people might have mobile phones and headsets. Enabling each person to configure their own devices to operate only with each other prevents one person's phone providing audio to another person's headset, for example.

By pairing the devices security can be enhanced since the chance of a rogue device successfully impersonating another device is reduced. Another objective of pairing is to simplify security. Devices can store security data that allows them to satisfy the security requirements of the devices with which they are paired.

In order to configure two devices to interoperate each one must be set so as to store the other's identity. The identity of one device could be entered into the other device by a user. However, the identity is typically a long string (usually 48 bits), which the user could easily mis-type. Therefore, it is more common for one device to be triggered by the user to perform a scan for other devices in the vicinity. In the case of Bluetooth this scanning operation uses an INQUIRY message.

In one configuration, when the scanning device has compiled a list of nearby devices it displays that list to a user, who can select from the list the one with which the device is to operate. Normally the user also selects a function for which the other device will be used. The device that the user is operating then stores the identity of the selected device for interoperation purposes. It may subsequently communicate with the selected device by means of a PAGE message, to establish a communication connection with the selected device. From the PAGE message the selected device can obtain and store the identity of the device that the user is operating, for use when communication is required in the future.

This procedure requires the user to be able to interact with at least one of the Bluetooth-enabled devices. That device must have some user input means, and preferably a display or other user output device, so that the user can interact with at least one of the devices to initiate and/or carry out the steps described above.

A disadvantage of current mechanisms for initiating the pairing of a PC with a user input device is that the user input device cannot provide input before it is itself connected, thus causing a difficulty in enabling a user to trigger pairing. For example, if a new keyboard is being introduced to a PC, that keyboard cannot be used to control the operation of the PC until it can be recognised by the PC, thus making it impossible for the keyboard to be used for the initiation of a pairing sequence. It may be possible for a mouse to be used to initiate the pairing sequence in this case, but a mouse only enables restricted types of inputs by a user, and a new PC might not be paired with a mouse or a keyboard. This is not only inconvenient for a user, it also inhibits the supply of wireless keyboard and mouse devices with new PCs.

One way of avoiding the above problem could be to temporarily connect a wired keyboard to the PC to instruct the PC to search for the new Bluetooth keyboard, but this is a relatively clumsy solution since it requires the presence of an otherwise superfluous keyboard.

Another solution could be to configure a PC to connect automatically to nearby Bluetooth devices each time it starts up, but this could cause unwanted nearby devices to become paired to the PC, which could lead to security problems.

SUMMARY OF THE INVENTION

It is an aim of the present invention to provide a method and apparatus for enabling communication between connectable devices while avoiding the above-mentioned problems.

According to a first aspect of the present invention there is provided a data processing system operable in a powered-up mode to accept user input from a first set of user input means and in a powered-down mode to accept user input from only a second set of user input means, the data processing system being configured when not in the powered-down mode to detect a user input from one of the second set of user input means, and in response to such detection to initiate a connection procedure to enable communication in the powered-up mode between the data processing system and a remote user input means.

The data processing system may comprise an operating system and volatile data storage, and in the powered-down mode the operating system may not be stored in the volatile data storage.

The data processing system may further comprise non-volatile data storage, and in the powered-down mode the operating system may be entirely stored in the non-volatile data storage.

In the powered-up mode, at least a part of the operating system may be stored in the volatile data storage.

The data processing system could further comprise a central processing unit, and in the powered-down mode the central processing unit could be configured not to execute instructions.

The data processing system may be configured in the powered-down mode to detect a user input from one of the second set of user input means and in response to such detection to initiate a start-up procedure causing the data processing system to enter the powered-up mode. The data processing system could suitably be configured to be responsive to the same one of the second set of user input means to: (i) when not in the powered-down mode, initiate the connection procedure; and (ii) when in the powered-down mode, initiate the start-up procedure. The data processing system could also be configured to initiate the connection procedure only in response to a user input from one of the second set of user input means during the start-up procedure.

The data processing system may be configured to perform the following steps in response to the said user input during the start-up procedure: (a) suspend the start-up procedure; (b) initiate the connection procedure; and (c) after the connection procedure is complete, resume the start-up procedure. The data processing system could be configured to resume the start-up procedure automatically in response to completion of the connection procedure.

The communication between the data processing system and the remote user input means could be wireless communication, and it could suitably be by means of the Bluetooth protocol.

The connection procedure could comprise setting a link key to enable secure communication between the data processing system and the remote user input means.

The data processing system could comprise a Bluetooth module, and the connection procedure could further comprise transmitting a USB command to the Bluetooth module in order to initiate the setting of the link key. The Bluetooth module could be embedded within the data processing system.

The connection procedure may involve transmitting an inquiry message from the data processing system.

The step of detecting a user input from one of the second set of user input means may comprise determining the duration of a button press. The data processing system may be configured to initiate the connection procedure only if the determined duration is less than a predetermined time, or alternatively greater than a predetermined time.

The second set of user input means could suitably be a subset of the first set of user input means.

According to a second aspect of the present invention there is provided a method for use in a data processing system operable in a powered-up mode to accept user input from a first set of user input means and in a powered-down mode to accept user input from only a second set of user input means, the method comprising: when the data processing system is not in the powered-down mode, detecting a user input from one of the second set of user input means; and in response to such detection, initiating a connection procedure to enable communication in the powered-up mode between the data processing system and a remote user input means.

According to a third aspect of the invention there is provided a computer program for use in a data processing system that is operable in a powered-up mode to accept user input from a first set of user input means and in a powered-down mode to accept user input from only a second set of user input means, the computer program being arranged to: when the data processing system is not in the powered-down mode, detect a user input from one of the second set of user input means; and in response to such detection, initiate a connection procedure to enable communication in the powered-up mode between the data processing system and a remote user input means.

According to a fourth aspect of the invention there is provided a connection initiator for use in a data processing system that is operable in a powered-up mode to accept user input from a first set of user input means and in a powered-down mode to accept user input from only a second set of user input means, the connection initiator being arranged to: when the data processing system is not in the powered-down mode, detect a user input from one of the second set of user input means; and in response to such detection, initiate a connection procedure to enable communication in the powered-up mode between the data processing system and a remote user input means.

BRIEF DESCRIPTION OF THE DRAWINGS

The invention will now be described by way of example with reference to the accompanying drawings, in which:

FIG. 3 shows the internal arrangement of a Bluetooth-enabled computer.

DETAILED DESCRIPTION OF THE PREFERRED EMBODIMENTS

Figure 2:
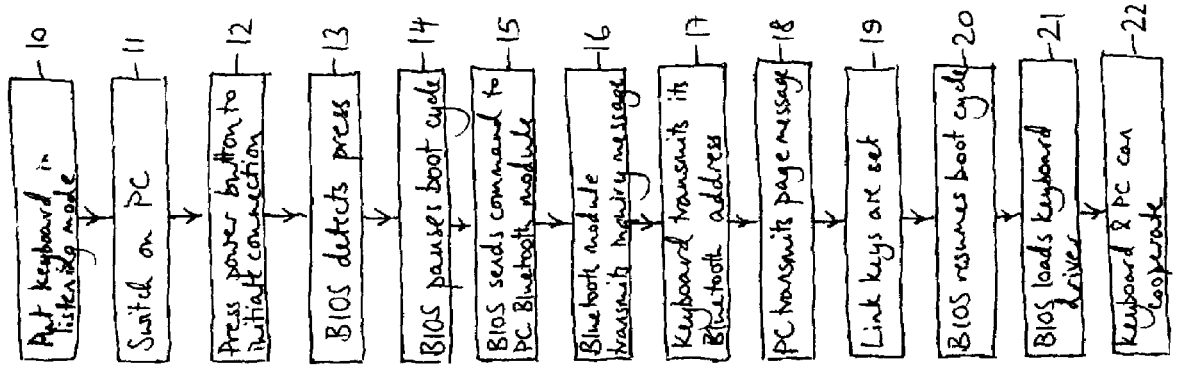
FIG. 2 is a flow chart representing the initiation of a pairing sequence in accordance with an embodiment of the invention.

The invention is described in the following example in the context of Bluetooth protocols, but it will be understood that the invention may also be applicable to other communication protocols, and in particular but not exclusively to other short-range wireless protocols. The main steps of the following example are summarised in FIG. 2.

Figure 1:
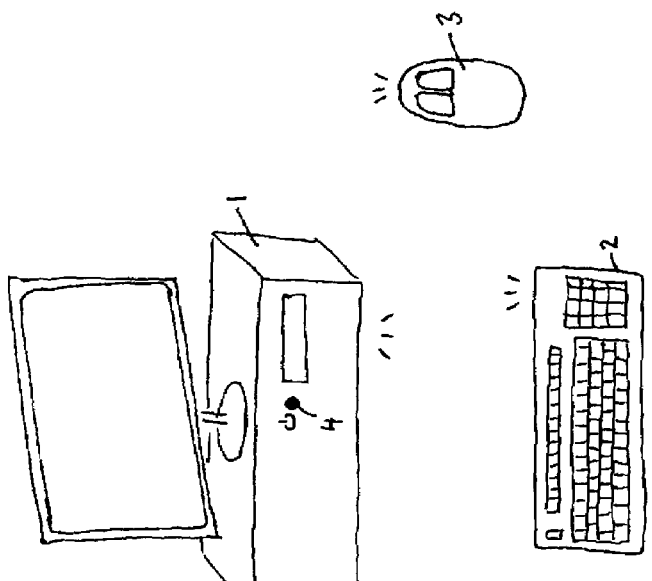
FIG. 1 shows a set of Bluetooth-enabled devices.

In FIG. 1, a keyboard 2 and a mouse 3 are shown in the vicinity of a PC 1, and all of these devices are Bluetooth-enabled. The PC is provided with a Bluetooth module implemented in firmware within the PC's chassis. In this exemplary scenario the PC's user has not previously used the keyboard 2 or the mouse 3 to communicate with the PC: he has previously used input devices connected by means of cables to the PC.

The PC 1 is configured in a known way such that a press of the power button 4 causes the PC to start up (see e.g. FIG. 2, step 11) or shut down, depending on its current state. In general, PCs are configured to detect user input via the power button irrespective of whether the PC is in a powered-off mode, a powering-up or -down mode, or a fully powered-up mode. Some PCs are provided with a single button that effects both powering up, powering down and resetting, and in such cases the BIOS is typically configured to detect the length of a user's press of the button, so that when the computer is switched off any press causes powering up, but when it is running a short press resets it and a long press powers it down. An alternative implementation is for a PC to be provided with separate power and reset buttons, so that any press of the power button is sufficient to power up or down the PC while any press of the reset button triggers a re-boot.

In this example, powering up (or starting up, or booting) is used to mean the procedure performed by a data processing system in order to bring it from a state in which it is not fully responsive to a user's input to a state in which it is fully operational. This can involve bringing a central processing unit (CPU) into an operative state in which it can execute instructions. It can also involve loading an operating system into volatile memory (typically DRAM) and passing control of the CPU to the operating system. It can include restoring the PC from hibernation (in which the contents of RAM are saved in non-volatile memory and the PC is brought into a low power-consumption mode) or from standby (in which certain functions of the PC are turned off or slowed down but the contents of its RAM remain intact).

Starting up typically involves accessing instructions held in non-volatile memory. In the case of a Windows-based PC, these instructions are typically stored in ROM or flash memory on a motherboard, and are generally termed the BIOS, or basic input/output system. The BIOS holds the program code required to enable the PC to control input/output devices such as keyboards and display screens, and is responsible for initialising hardware used by the PC and for loading the operating system into RAM. In order to initialise hardware components the BIOS may contain drivers for certain devices such as standard wired keyboards. However, it is generally the case at present that driver software for wireless hardware components is not built in to a BIOS, such that separate drivers must be installed in order for a PC to be able to co-operate with such a device. This may be done by means of a CD carrying the installation software, or the driver may be built into the hardware and could be installed on demand if needed.

In a start-up sequence, once the operating system has been loaded the BIOS passes control of the data processing system to the operating system, and the data processing system can subsequently receive input from a user through the operating system.

Referring to the set-up shown in FIG. 1, a Bluetooth module is embedded within the PC 1 to make possible Bluetooth communications between the PC and remote devices. In the present example, no user operable input means is provided on the module itself to enable a user to initiate a Bluetooth pairing sequence for a particular device. This would typically be the case if the module is enclosed within the PC's outer casing and is thus inaccessible to a user. On the other hand, some known types of Bluetooth modules can be connected to a data processing system via a USB port, and such modules can be provided with a button that remains external to the PC to allow users to initiate a pairing sequence to cause compatible remote devices to be identified by the data processing system.

In this example, the user wishes to trigger a pairing of the PC with the Bluetooth keyboard 2 such that the user can communicate with the PC using this device. The user has previously installed driver software on the PC to enable the functionality required for communication between the operating system and the Bluetooth keyboard. In order to achieve a pairing with the keyboard the user first places the keyboard in a connecting mode (FIG. 2, step 10), in which the keyboard will listen for signals at Bluetooth frequencies. The keyboard could be arranged to be permanently in this mode, or in this mode as default, or it could require user input to enable this mode. With the PC in a switched-on mode (step 11), the user presses the power button 4 on the PC for a short period of time (step 12). The BIOS of the PC is configured to detect this short press (step 13), and the following sequence of events occurs in response:

A) The BIOS optionally pauses the booting-up cycle (see below step 14) and transmits a command to the PC's Bluetooth module (step 15).

B) An inquiry message is transmitted from the PC by means of the Bluetooth module (step 16).

C) The keyboard receives the inquiry message and responds by transmitting a Bluetooth signal including its unique device address (step 17). The response may also include details of the clock settings of the keyboard's Bluetooth module.

D) The PC receives the keyboard's response and transmits a page message including the device address of the keyboard (step 18). This message is repeatedly transmitted on different Bluetooth frequency channels, and the keyboard's clock data can be used by the Bluetooth module of the PC to schedule the transmissions efficiently for reception by the keyboard.

E) The keyboard receives a page message from the PC and identifies its own address in the message.

F) Authentication and security information is then passed between the two devices in order to establish a secure link between them, during which process a link key is generated and shared between the devices for use in subsequent secure communications (step 19). Link management procedures for generating initialisation and link keys and for authentication will be well known to a person skilled in the art and are not described in further detail here. If the boot-up cycle was paused at step 14, then the BIOS resumes the boot-up cycle at this time (step 20).

It can be seen from the above example that a solution is proposed to the problems faced by the prior art: pairing can be achieved by a user instructing the PC to discover a remote device, without the use of any separate input means apart from the power button (or reset or other button) already provided on the PC chassis.

The command referred to in step A above could conveniently be a USB command, since this would require minimal adaptation of the capabilities of a common BIOS.

The connection procedure initiated in accordance with the invention is described in the above example as a Bluetooth pairing sequence, but in general it could be any procedure that enables the data processing system and the remote user input means to recognise each other for the purpose of transmitting data between them. It could optionally be such as to enable secure communication, as in the example of a Bluetooth pairing sequence.

It will be understood by a skilled person that the initiating device need not be a personal computer: it could be any other type of data processing system, including for example a personal digital assistant, a mobile telephone or a games console. Embodiments of the invention are especially useful where the initiating device has restricted built-in user input means, for example a PC that has only a power switch and a reset button. However, the invention is not limited to such situations. The initiating device could be configured to detect a user input from any user input means, but the invention is especially useful in cases where the initiating device has integral user input means (such as the power button on a PC chassis) from which it can receive a user input even when it is not responsive to any other user input means. The term "power button" is used in this context to mean the button used for booting-up the PC, rather than the button for disconnecting the PC entirely from a power source, which is commonly known as an on/off switch.

In view of the manner in which relatively complex data processing systems such as PCs are configured to boot, it can be especially convenient for a user to instruct the data processing system to pair with a remote user input means during the boot sequence itself. In particular, it is convenient for the remote device to be recognisable by the data processing system by the stage in the booting process at which the driver software would be loaded. In general, it is the task of a BIOS to launch the driver for a piece of hardware in advance of control being passed to the operating system, so that by the time the operating system takes control any routines required to enable communication with that piece of hardware are loaded into the computer's memory and accessible by the operating system. In the case of a Bluetooth keyboard, the corresponding driver would need to have been previously installed on the PC (as explained above), and on installation a pointer to the location of the driver would typically be added to the BIOS so that in any subsequent boot the BIOS could automatically locate and load the driver. Since the BIOS is responsible for launching hardware drivers, it is desirable for the BIOS also to handle connection procedures of the type initiated in accordance with the present invention. The BIOS's driver loading capabilities tend only to be active at start-up time, and so it is desirable to initiate the connection procedure during start-up to enable the BIOS to subsequently load the corresponding driver (step 21). By implementing the connection procedure at such a time, significant modification of standard operating systems can be avoided.

Accordingly, a preferred embodiment of the invention involves triggering the pairing sequence (that is, implementing the predetermined user operation) during the start-up (or boot) procedure. The PC could even be configured only to respond to a user's request to initiate a connection procedure if that request is made in the period between the start of the boot cycle and the stage of the boot cycle at which hardware drivers are to be loaded.

Alternatively, the pairing sequence may be triggered at a time when the PC already is booted-up with all device drivers and is running. In this case, steps 14, 20 and 21 would not be necessary.

In a specific example according to the preferred embodiment, a user presses the power button 4 of a PC for a relatively long time (say 2 seconds or longer) to trigger the power-up sequence (step 11), and after a few more seconds (say within 10 seconds), presses the power button for a second time (step 12) but this time for only a relatively short time (say 0.5 seconds). In this case, the BIOS would not have completed the boot cycle, so the Bluetooth keyboard would be connected before control is passed to the operating system. Since the BIOS is preferably given the task of causing the pairing, the BIOS is configured to monitor the PC's power button 4, for example during the Power-On Self Test procedure of the boot, and if it detects a short press (step 13), to perform the following sequence:

1) Pause the normal boot cycle (step 14).

2) Implement the pairing sequence set out in steps A to F above.

3) Continue the boot cycle after the pairing sequence is completed and the PC's Bluetooth module and the keyboard share a link key (step 20).

Step 3 above could be implemented a predetermined time after the start of step 2, with the predetermined time being sufficiently long to enable a normal pairing to be completed, or it could be implemented automatically in response to an indication, for example from the Bluetooth module, that the pairing sequence is complete. Once the boot cycle is complete, the PC 1 and the keyboard 2 are able to communicate with each other (step 22).

It may also be possible for a user to trigger a pairing sequence to cause the PC 1 to recognise a remote user input device by means of a command to the operating system via a remote user input device that is already connected. For example, if the keyboard 2 is already paired with the PC and is capable of communicating wirelessly with the PC, then the PC could be caused to pair with an unpaired mouse 3 in response to a user's input through the keyboard. However, there may be circumstances in which no user input devices are connected for communication with the PC, for example when the PC is first set up for use or when it is being transferred for use by a new user with his own keyboard and mouse. In known systems, the only way in which a user could communicate with the PC in such a situation would be by temporarily connecting a wired user input device to the PC to enable a user to instruct the PC to look for the new wireless devices 2 and 3. In such circumstances, embodiments of the invention can be highly advantageous since they avoid the inconvenience of connecting a further device to the PC to enable commands to be provided to the PC.

The functionality of the user input means that triggers the connection procedure could be arranged to be modifiable by a user by means of the operating system of the data processing system. For example, a power button could be modifiable such that a press of less than 2 seconds causes pairing while a press of 2 seconds or more causes powering up or down.

FIG. 3 shows schematically the configuration of a PC suitable for use in accordance with the invention. The PC 1 is a standard PC having a power supply unit (PSU) 42 and a CPU 41. The PSU can be connected to or disconnected from an external power supply (such as a mains power supply) by means of an on/off switch 45, and it is additionally in communication with a power button 4 which enables a user to boot and shut down the PC. The PSU supplies power to the various hardware components of the PC including the CPU 41 and a Bluetooth module 40 by means of connections 44. The CPU can control the Bluetooth module by means of a control line 43. The Bluetooth module 40 may communicate with a nearby wireless keyboard 2 which has its own Bluetooth module 30, thereby enabling a user to communicate with the PC through the keyboard.

Embodiments of the present invention could be implemented in hardware or software, or in a combination of both.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A data processing system operable in a powered-up mode to accept user input from a first set of user input means and in a powered-down mode to accept user input from only a second set of user input means, the data processing system being configured when not in the powered-down mode to detect a user input from one of the second set of user input means, and in response to such detection to initiate a connection procedure, without the data processing system resetting, to enable communication in the powered-up mode between the data processing system and a remote user input means that is unknown to the data processing system at the time said procedure takes place.

2. A data processing system according to claim 1 comprising an operating system and volatile data storage, wherein in the powered-down mode the operating system is not stored in the volatile data storage.

3. A data processing system according to claim 2 further comprising non-volatile data storage, wherein in the powered-down mode the operating system is entirely stored in the non-volatile data storage.

4. A data processing system according to claim 2 wherein in the powered-up mode at least a part of the operating system is stored in the volatile data storage.

5. A data processing system according to claim 1 further comprising a central processing unit, wherein in the powered-down mode the central processing unit is configured not to execute instructions.

6. A data processing system according to claim 1 configured in the powered-down mode to detect a user input from one of the second set of user input means and in response to such detection to initiate a start-up procedure causing the data processing system to enter the powered-up mode.

7. A data processing system according to claim 6 configured to be responsive to the same one of the second set of user input means to: (i) when not in the powered-down mode, initiate the connection procedure; and (ii) when in the powered-down mode, initiate the start-up procedure.

8. A data processing system according to claim 6 configured to initiate the connection procedure only in response to a user input from one of the second set of user input means during the start-up procedure.

9. A data processing system according to claim 8 configured to perform the following steps in response to the said user input during the start-up procedure:
(a) suspend the start-up procedure;
(b) initiate the connection procedure; and
(c) after the connection procedure is complete, resume the start-up procedure.

10. A data processing system according to claim 9 further configured to resume the start-up procedure automatically in response to completion of the connection procedure.

11. A data processing system according to claim 1 wherein the said communication between the data processing system and the remote user input means is wireless.

12. A data processing system according to claim 11 wherein the said communication between the data processing system and the remote user input means is by means of the Bluetooth protocol.

13. A data processing system according to claim 12 wherein the connection procedure comprises setting a link key to enable secure communication between the data processing system and the remote user input means.

14. A data processing system according to claim 13 comprising a Bluetooth module.

15. A data processing system according to claim 14 wherein the connection procedure further comprises transmitting a USB command to the Bluetooth module in order to initiate the setting of the link key.

16. A data processing system according to claim 14 wherein the Bluetooth module is embedded within the data processing system.

17. A data processing system according to claim 12 wherein the connection procedure involves transmitting an inquiry message from the data processing system.

18. A data processing system according to claim 1 wherein the step of detecting a user input from one of the second set of user input means comprises determining the duration of a button press.

19. A data processing system according to claim 18 configured to initiate the connection procedure only if the determined duration is less than a predetermined time.

20. A data processing system according to claim 18 configured to initiate the connection procedure only if the determined duration is greater than a predetermined time.

21. A data processing system according to claim 1 wherein the second set of user input means is a subset of the first set of user input means.

22. A method for use in a data processing system operable in a powered-up mode to accept user input from a first set of user input means and in a powered-down mode to accept user input from only a second set of user input means, the method comprising:
when the data processing system is not in the powered-down mode, detecting a user input from one of the second set of user input means; and
in response to such detection, initiating a connection procedure, without the data processing system resetting, to enable communication in the powered-up mode between the data processing system and a remote user input means that is unknown to the data processing system at the time said procedure takes place.

23. A initiating device for use in a data processing system that is operable in a powered-up mode to accept user input from a first set of user input means and in a powered-down mode to accept user input from only a second set of user input means, the initiating device being arranged to:
when the data processing system is not in the powered-down mode, detect a user input from one of the second set of user input means; and
in response to such detection, initiate a connection procedure, without the data processing system resetting, to enable communication in the powered-up mode between the data processing system and a remote user input means that is unknown to the data processing system at the time said procedure takes place.

\* \* \* \* \*